Figure 1:
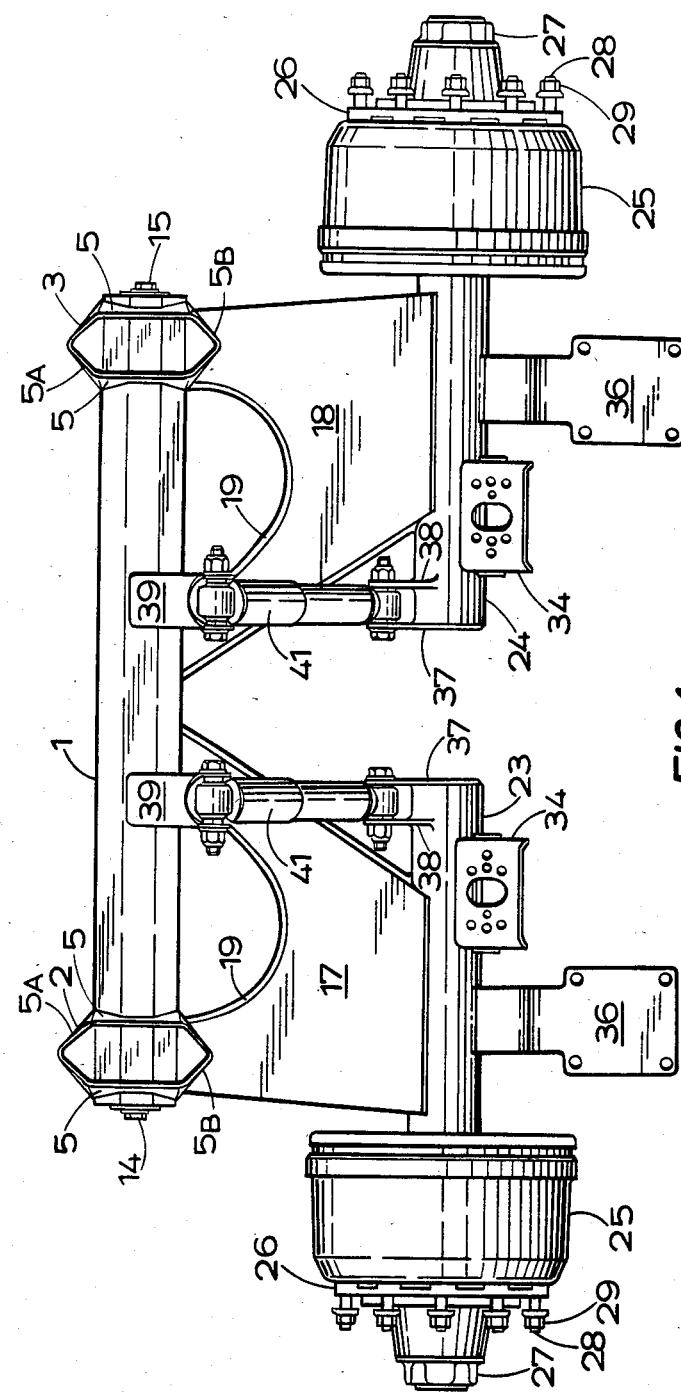

United States Patent [19]

Davis

[11] Patent Number: 4,593,930
[45] Date of Patent: Jun. 10, 1986

[54] RUNNING GEAR FOR A TRAILER VEHICLE

[75] Inventor: Robert C. B. Davis, Caverswall, England

[73] Assignee: Rubery Owen-Rockwell Limited, Wednesbury, England

[21] Appl. No.: 659,901

[22] Filed: Oct. 12, 1984

[51] Int. Cl.$^4$ ............................................. B60G 3/02
[52] U.S. Cl. ................................... 280/690; 280/698
[58] Field of Search ............... 280/698, 661, 690, 697, 280/713, 43.18; 267/15 R, 33

[56] References Cited

U.S. PATENT DOCUMENTS

| | | | |
|---|---|---|---|
| 3,166,340 | 1/1965 | Rusconi | 280/698 |
| 3,512,800 | 5/1970 | Winsen | 280/698 |
| 3,746,363 | 7/1973 | Borns | 280/690 |
| 4,453,735 | 6/1984 | Penverne et al. | 280/690 |

*Primary Examiner*—Richard A. Bertsch
*Attorney, Agent, or Firm*—Scrivener Clarke Scrivener and Johnson

[57] ABSTRACT

Running gear comprises a beam having upwardly directed, aligned, first brackets at or towards each end for attachment of the beam transversely to a trailer, aligned second brackets depending from the beam at or towards its ends, at least one third bracket depending from the beam in alignment with and intermediate the second brackets, arms respectively pivoted at their front ends to a second bracket and the or a third bracket and carrying stub axles at their rear ends on which are brake means and wheel mounting means, and rigid with and extending rearwardly from each arm and stub axle assembly a member having a platform for an air spring. The running gear is fixed as a unit to a trailer chassis by the first brackets. Preferably the beam is tubular of vertically elongated hexagonal cross-section, and upper and lower regions of the section are embraced by the first and second brackets respectively.

12 Claims, 8 Drawing Figures

RUNNING GEAR FOR A TRAILER VEHICLE

This invention relates to running gear, that is to say an assembly of axle and suspension, primarily intended for trailer vehicles.

It has hitherto been the practice to provide a trailer vehicle with at least one non-rotating axle beam which has a brake assembly and a bearing support at each end. The bearing support may be fitted with a hub (carried by bearings) to which a wheel is bolted. Alternatively the wheel and bearings may be fitted directly to the support. Inboard of each brake assembly the axle beam is secured, generally by U-bolts, to a suspension. The suspension commonly comprises front and rear hanger brackets, one or more superimposed spring leaves extending between these brackets and a spring seat intermediate the brackets to which the axle beam and spring are secured. The brackets are secured to and depend from the trailer chassis. A torque arm is pivotally secured between each front hanger bracket and the corresponding spring seat to define the locus of the axle. More recently this leaf spring type suspension has been supplemented or replaced by air suspension using pressurised air bags. The non-rotating through axle beam is still retained in these newer suspensions, removably secured to pivotal arms of the suspension. That is to say, the axle, comprising axle beam and brake assemblies, and the suspension are separate units, each having its own identity and frequently made by different manufacturers.

The present invention seeks to provide an integral unit which makes possible a lighter construction.

According to the present invention a trailer running gear comprises an elongate beam having upwardly directed and aligned first brackets at or towards each end thereof adapted for attachment to a vehicle so that the beam extends transversely thereof, aligned second brackets depending from the beam at or towards each end thereof, at least one third bracket depending from the beam intermediate and aligned with the second brackets, first and second arms each pivotally carried at a front end thereof by one of the second brackets and by the third bracket or one of the third brackets, a stub axle carried by and extending transversly outwardly from a rear end of each arm, brake means on each stub axle and means for mounting a wheel rotatably thereon, and a member rigid with and extending rearwardly from each arm and stub axle assembly and having a platform adapted to mount an air spring thereon.

For lightness the beam is preferably of tubular construction. The beam may be of elongate section whereby its depth (that is, its top to bottom dimension) is greater than its width. The beam may be of hexagonal shape in cross-section.

Upper and lower regions of the beam are preferably embraced by the first and second brackets respectively. The or each third bracket may also embrace the lower region of the beam.

Two fourth brackets may extend upwardly and rearwardly from the beam and a shock absorber may be pivotally mounted between each fourth bracket and respective anchorages on the arm and stub axle assemblies.

The first brackets may be of tubular construction and of a length to suit the required platform height of the trailer to which the running gear is to be fitted.

Figure 2:
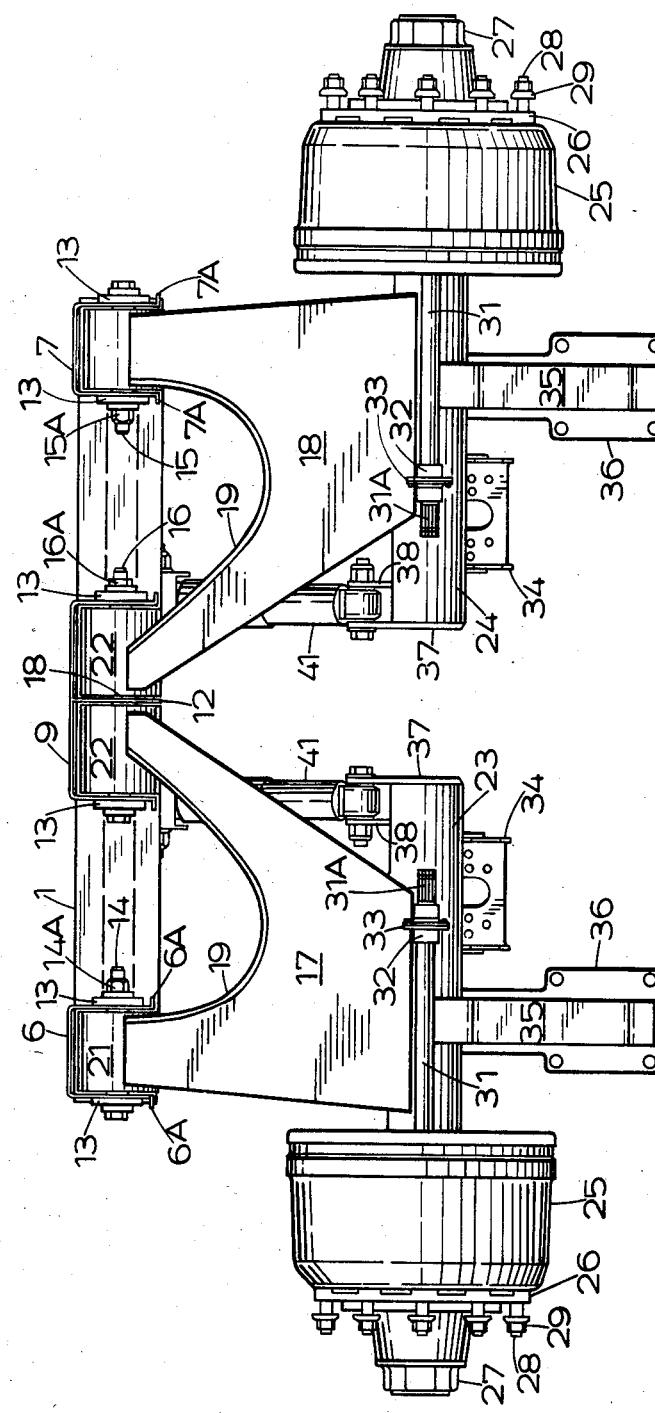
Figure 3:
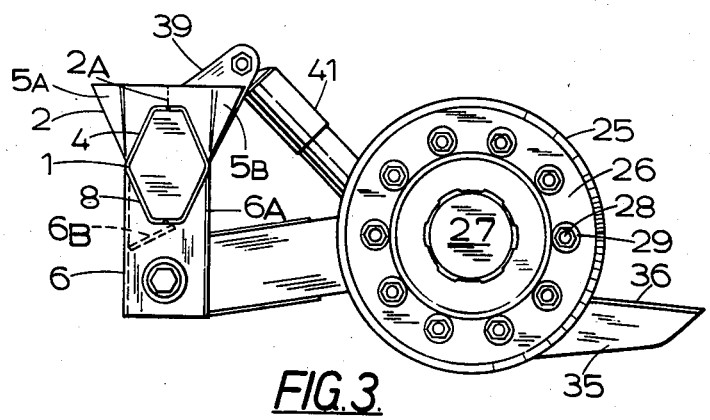
Figures 6, 7:
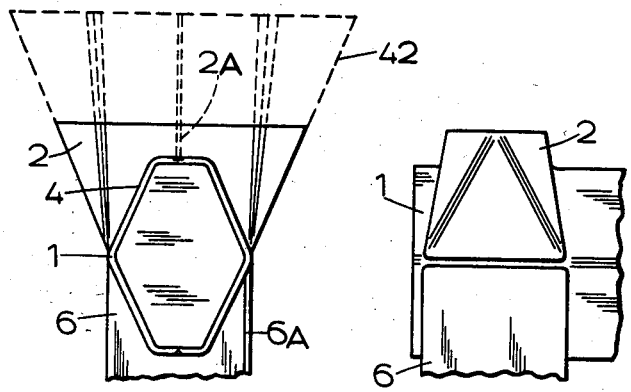
Figure 8:
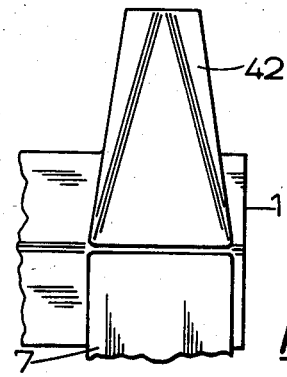
Figure 4:
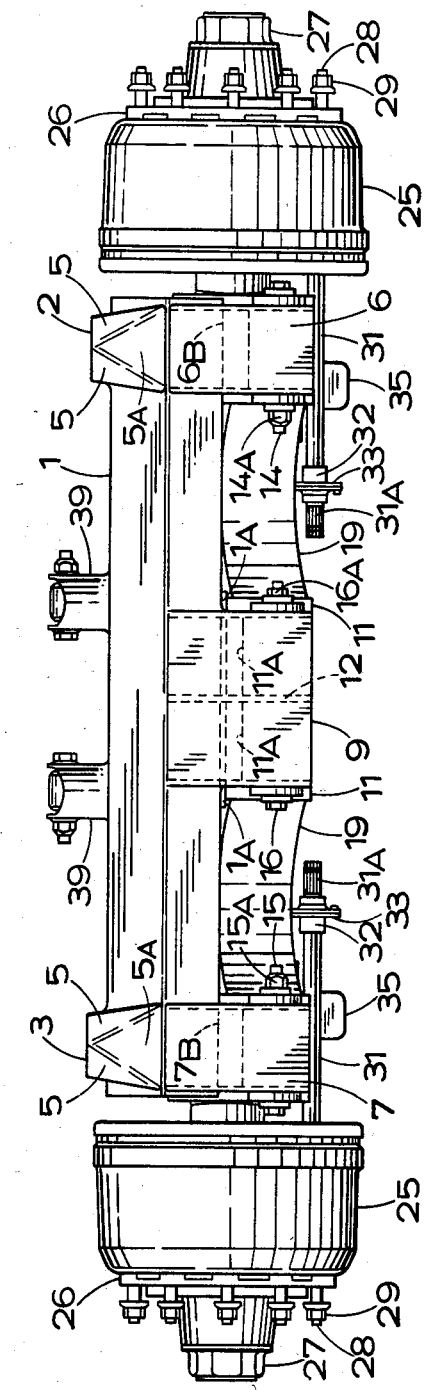
Figure 5:
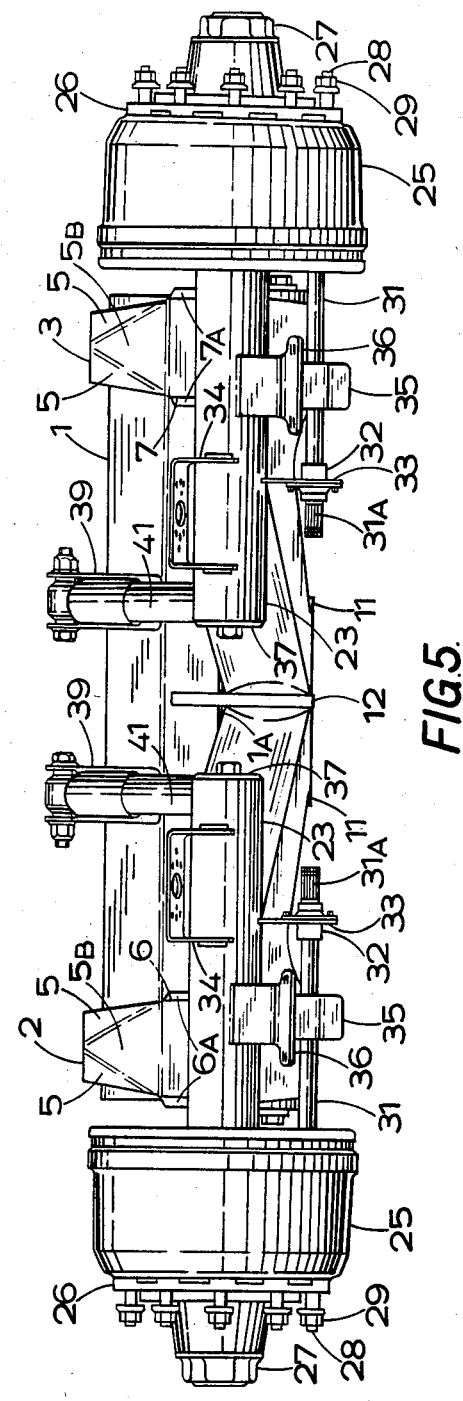

An embodiment of the invention will now be described by way of example with reference to the accompanying drawings of running gear according to the invention in which:

FIG. 1 is a plan view,
FIG. 2 is an underneath plan view,
FIG. 3 is a side view,
FIG. 4 is a front elevation,
FIG. 5 is a rear elevation,
FIG. 6 is a fragmentary view of one end of the beam showing alternative first brackets, and
FIGS. 7 and 8 are front elevations of the end of the beam shown in FIG. 6 respectively showing the alternative first brackets.

In this embodiment the running gear is for a single pair of wheels. It has a hexagonal section tubular beam 1 which has upwardly directed first brackets 2, 3 secured to it adjacent its ends. As shown in FIGS. 3 and 6, the beam 1 comprises similar front and rear half pressings which are welded together along their longitudinal edges. The depth of the beam is greater than its width. Each first bracket 2, 3 may also comprise two similar front and rear half pressings, see FIGS. 3 and 6, which are welded together at abuting vertical edges 2A to form the bracket and then welded in place on the beam 1. The first brackets have cut-outs 4 of generally inverted trough-shape in their sides so as to fit on and embrace the upper half of the beam 1. It will also be seen that the sides 5 of the first brackets 2, 3 are splayed outwardly, FIGS. 1, 4, 5, adjacent their connection to the beam and that front and rear walls 5A and 5B respectively of the brackets are upwardly splayed forwardly and rearwardly so that the tops of the brackets are wider than the beam 1, FIGS. 1 and 3. The front and rear walls 5A, 5B take a V-shaped section as they extend upwardly with the result that at their upper ends the brackets have a horizontal cross-section which is not only elongated transversely of the beam but narrows towards its forward and rearward extremities.

Depending second brackets 6, 7 are secured to the beam 1 adjacent its ends. These second brackets 6, 7 are directly below the respective first brackets 2, 3 and comprise generally channel-shaped pressings which are welded to the beam 1. As seen in FIG. 3, the sides of the pressings have cut-outs 8 of generally trough shape so as to fit on and embrace the lower half of the beam 1 and have outwardly directed flanges 6A, 7A. A reinforcing plate 6B, 7B, FIGS. 3 and 4, is welded between the bottom face of the beam 1 and a front wall of bracket 6, 7 within the bracket.

Referring to FIG. 4, a reinforcing strap 1A is welded to the bottom of the beam 1 and extends to either side of the longitudinal centre of the beam. A depending third bracket 9 is secured to the beam 1 centrally thereof and over the strap 1A. This third bracket 9 comprises a pressing similar to the pressings of the second brackets 6, 7 but longer. Its sides have cut-outs, not shown, of generally trough shape so as to fit on and embrace the lower half of the beam 1, and have outwardly directed flanges 11.

A centre support 12 is secured to depend from the beam 1 midway between the sides of the third bracket 9. The centre support 12 also has a cut-out, not shown, of generally trough shape so as to fit over the strap 1A and embrace the lower half of the beam 1. Reinforcing plates 11A, FIG. 4, similar to reinforcing plates 6B, 7B, are secured between the strap 1A and the base of the third bracket 9 at either side of the centre support 12.

The brackets 6, 7, 9 and the centre support 12 are all in alignment and have aligned holes each of which contains a bush 13, FIG. 2, to receive bolts 14, 15 and 16 which retain first and second arms 17, 18 and provide a pivotal axis for them.

Each arm 17, 18 comprises upper and lower half pressings which are secured together, as by welding, and include side walls, a curved closing plate 19 and two bosses 21, 22. The bosses 21, 22 are bored to receive bearing bushes, not shown, and are entered into the respective brackets 6, 9 and 7, 9 with thrust washers, not shown, and are secured therein for pivotal movement by the bolts 14, 15, 16 and nuts 14A, 15A, 16A respectively screwed on the bolts.

Aligned outwardly directed stub axles 23, 24 are secured, as by welding, to the respective arms 17, 18. At their outer ends the stub axles carry brake assemblies represented here by brake drums 25, hubs 26 mounted on bearings, not shown, on spindle ends of the stub axle, and hub caps 27. Bolts 28 and nuts 29 are provided for mounting a wheel, not shown, on each hub 26. A conventional S-camshaft 31 for operating each brake is supported in a bearing 32 carried by a bracket 33 welded to and depending from the respective stub axle 23, 24. The camshaft 31 is splined at the inner end 31A to receive an operating arm, not shown, by which it is connected in known manner to a pressure air operated actuator, not shown, to be mounted on a bracket 34, FIGS. 2 and 5, which is also welded to each stub axle 23, 24.

A member 35 extends rearwardly and downwardly from each stub axle to which it is secured as by welding. Each member 35 terminates in a platform 36 to which one end of a known air spring can be secured, the other end of the air spring being arranged to be secured to a mounting on the underside of the trailer.

The inner end of each stub axle 23, 24 conveniently carries a plate 37 which extends upwardly and towards the beam 1. Outboard of each plate 37 and aligned therewith is a bracket 38, FIG. 1 which is secured to the respective stub axle as by welding. Further brackets 39 are secured to and extend upwardly and rearwardly from the beam 1 in alignment with each plate 37 and its corresponding bracket 38. Telescopic shock absorbers 41 are pivotally mounted between the respective brackets 39 and the corresponding plates 37 and brackets 38.

Referring now to FIG. 6, it will be seen that the first bracket 2 shown has an upward extension indicated by broken lines at 42. A front view of this extended bracket 42 is shown in FIG. 8. It will be appreciated that different designs of trailer may have different platform heights and consequently provision is required to accommodate such differences when a suspension is fitted to a specific trailer. This is achieved in the running gear of this invention by making the first brackets 2 of suitable heights. By selection of the size of blank fed to the press tool which makes the half pressings which are welded together to make the brackets 2 brackets of different heights can be readily produced, as can be seen by comparing the brackets of FIGS. 7 and 8.

Whereas other independent air suspensions are available the running gear of this invention considerably eases the installation for the trailer builder because it is one integral unit with conventional chassis attachment. This construction enables a complete running gear to be built up with first brackets 2, 3 of a height specified by the trailer builder. The latter offers the running gear up to the trailer chassis, for example conventional, longitudinally extending I-beams thereof, in correct alignment and welds the first brackets 2, 3 to the chassis. This provides considerable saving of time, and hence cost, when compared with the fitting of earlier conventional suspensions and axles.

The elongation of the cross-section of the upper ends of the first brackets 2, 3 transversely of the beam 1 together with the narrowing of this cross-section towards its forward and rearward extremities helps to avoid stress concentration effects on the chassis of a trailer as compared with conventional square-ended brackets which are welded transversely across the lower flanges of the chassis I-beams.

The beam 1 is light and immensely strong and is reinforced by the design of the first brackets 2, 3 and second brackets 6, 7 and their location as described opposite one another. The first brackets 2, 3 provide a secure mounting on the trailer with a generous spread of load.

The depth of the beam 1 provides ample resistance to bending loads imposed through the third bracket 9. The beam section chosen provides maximum strength to weight ratio for the loads and forces encountered. It is deeper than it is wide because the vertical plane bending moments are greater than the horizontal plane bending moments. It has a cross-sectional area adequate to resist the torsional moments produced by the offset of the horizontal loads and the shock absorber loads. The use of the single, centrally positioned, third bracket 9 is preferred for lightness and economy of construction. However, separate inner brackets for each arm 17, 18 may be provided if desired.

The running gear which has been described may readily be varied for use with twin pairs of wheels instead of the single pair of wheels as described.

I claim:

1. A running gear for, a trailer vehicle comprising an elongate beam, upwardly directed and aligned first brackets rigid with said beam adjacent each end thereof and being adapted for transverse attachment of said beam to a trailer vehicle, aligned second brackets depending from said beam adjacent each end thereof, third bracket means depending from said beam intermediate and aligned with said second brackets, first and second arms each having a front end and a rear end and each being pivotally carried at said front end by one of said second brackets and by said third bracket, a stub axle carried by and extending transversely outwards from said rear end of each said arm, each said arm and said respective stub axle thereby forming an assembly, brake means and wheel mounting means on each said stub axle, and a member rigid with and extending rearwardly from each said assembly and having a platform adapted to mount an air spring thereon.

2. A running gear according to claim 1 in which each said second bracket is mounted directly below a respective one of said first brackets.

3. A running gear according to claim 1 or claim 2 in which said beam is of tubular construction.

4. A running gear according to claim 1 in which said beam has upper and lower regions which are embraced by said first and second brackets respectively.

5. A running gear according to claim 1 in which said beam has a lower region which is embraced by said, third means.

6. A running gear according to claim 1 in which said beam is of tubular construction and has an elongate cross-section whereby the depth of said beam is greater than its width.

7. A running gear according to claim 6 in which said beam is of hexagonal shape in cross-section.

8. A running gear according to claim 1 in which said first brackets at their upper ends have a cross-section which is elongated transversely of said beam and which narrows towards forward and rearward extremities thereof.

9. A running gear according to claim 1 in which said first brackets are of tubular construction and have sides which are splayed outwardly adjacent to said beam.

10. A running gear according to claim 9 in which said first brackets have front and rear walls which are splayed outwardly, the construction and arrangement being such that each said first bracket is wider at its top than said beam.

11. A running gear according to claim 1 in which two laterally spaced fourth brackets extend upwardly and rearwardly from said beam, each said assembly has an anchorage in alignment with a respective one of said fourth brackets, and a telescopic shock absorber is pivotally mounted between each said anchorage and said respective aligned fourth bracket.

12. A running gear according to claim 1 in which said third bracket means comprises two brackets aligned with said second brackets, each of said two brackets in combination with an adjacent one of said second brackets pivotally carrying a respective one of said first and second arms.

* * * * *